United States Patent [19]

Galvanauskas

[11] Patent Number: 5,400,350
[45] Date of Patent: Mar. 21, 1995

[54] METHOD AND APPARATUS FOR GENERATING HIGH ENERGY ULTRASHORT PULSES

[75] Inventor: Almantas Galvanauskas, Ann Arbor, Mich.

[73] Assignee: IMRA America, Inc., Ann Arbor, Mich.

[21] Appl. No.: 220,911

[22] Filed: Mar. 31, 1994

[51] Int. Cl.$^6$ .............................................. H01S 3/10
[52] U.S. Cl. ...................................... 372/20; 372/19; 372/99; 372/96; 372/25; 372/97; 372/102
[58] Field of Search .................... 372/20, 19, 92, 99, 372/96, 25, 97, 102

[56] References Cited

U.S. PATENT DOCUMENTS

| | | | |
|---|---|---|---|
| 5,095,487 | 3/1992 | Meyerhofer et al. | 372/25 |
| 5,140,600 | 8/1992 | Rebhan | 372/25 |
| 5,260,954 | 11/1993 | Dane et al. | 372/25 |

OTHER PUBLICATIONS

A. Galvanauskas et al, "Generation of femtosecond optical pulses with nanojoule energy from a diode laser and fiber based system", *Appl. Phys. Lett.*, 63 (13), 27 Sep. 1993, pp. 1742–1744.

B. Desthieux et al, "111 Kw (0.5mJ) pulse amplification at 1.5 μm using a gated cascade of three erbium-doped fiber amplifiers", *Appli. Phys. Lett.*, 63 (5), 2 Aug. 1993, pp. 586–587.

Donna Strickland et al, "Compression of Amplified Chirped Optical Pulses", *Optics Communications*, vol. 56, No. 3, Dec. 1, 1985, pp. 219–221.

D. Strickland et al., "Generation of Ultrahigh Peak Power Pulses by Chirped Pulse Amplification", *IEEE Journal of Quantum Electronics*, vol. 24, No. 2, February 1988, pp. 398–403.

A. Galvanauskas et al, "High-power chirped pulse amplification of femtosecond optical pulses in a diode-pumped fiber laser and amplifier system", IMRA America, Inc., pp. 1–4 and 4 paged of drawings, 1994.

M. E. Fermann et al, "All-fiber source of 100 Nj Sub-picosecond pulses", IMRA America, Inc., pp. 1–7 and 7 paged of drawings, 1994.

N. Stelmakh et al, "Ultrashort pulse generation from a Q-switched AlGaAs laser with cw injection", *Appl. Phys. Lett.*, vol. 59, No. 6, Aug. 5, 1991, pp. 624–626.

Wang-hua Xiang et al, "Femtosecond external-cavity surface-emitting InGaAs/InP multiple-quantum-well laser", *Optics Letters*, vol. 16, No. 18, Sep. 15, 1991, pp. 1394–1396.

A. Galvanauskas et al, "Real-time picosecond electro-optic oscilloscope technique using a tunable semiconductor laser", *Appl. Phys. Lett.*, 60 (2), Jan. 13, 1992, pp. 145–147.

Jean-Pierre Weber, "Optimization of the carrier-induced effective index change in InGaAsP/InP waveguides-Application to tunable Bragg filters", *IEE Journal of Quantum Electronics* and Ericsson Telecom AB (Dec. 17, 1992), pp. 1–24 and Figs. 1–14.

R. C. Alferness et al, AT&T Bell Laboratories, Holmdel, N.J., "Broadly tunable InGaAsP/InP laser based on a vertical coupler filter with 57-nm tuning range", published Apr. 15, 1992.

*Primary Examiner*—Léon Scott, Jr.
*Attorney, Agent, or Firm*—Burns, Doane, Swecker & Mathis

[57] ABSTRACT

The present invention is directed to providing compact systems and methods for producing and amplifying chirped pulses to provide high energy ultrashort pulses. Further, the present invention is directed to providing a compact system which is reliable and cost effective to fabricate. In accordance with exemplary embodiments, relatively compact tunable lasers can be used to directly generate long chirped optical pulses. For example, compact monolithic semiconductor lasers which have relatively small dimensions (e.g., dimensions smaller than large frame solid state lasers) and which permit their emission wavelength to be tuned (i.e., changed) relatively fast during the generation of an optical pulse can be used. These pulse sources eliminate any need for bulk components in the cavity of, for example, a mode-locked femtosecond laser. The relatively long chirped optical pulses can subsequently be amplified in plural amplification stages to increase their energy content. In accordance with exemplary embodiments, amplification in plural stages can be achieved by suppressing spontaneous emission between the stages. Afterwards, the amplified pluses can be recompressed.

24 Claims, 7 Drawing Sheets

METHOD AND APPARATUS FOR GENERATING HIGH ENERGY ULTRASHORT PULSES

BACKGROUND OF THE INVENTION

1. Field of the Invention

The present invention relates generally to the field of laser technology, and more particularly, to methods and apparatus for generating high energy, ultrashort optical pulses.

2. State of the Art

Both semiconductor sources (e.g., diode) and fiber sources are known which can produce ultrashort energy pulses having sub-picosecond pulse durations. Although these energy sources can provide reliable, robust operation in a compact, cost-effective manner, their inability to produce pulse energies comparable to those of large frame solid-state sources has limited their practical use. A document co-authored by the present inventor and entitled "Generation of femtosecond optical pulses with nanoJoule energy from a diode laser and fiber based system," by A. Galvanauskas et al., Appl. Phys. Lett. 63 (13), Sep. 27, 1993, 1993: Amer. Inst. of Physics, pp. 1742–1744, describes using a tunable distributed Bragg-reflector (DBR) diode laser to produce chirped pulses. The chirped pulses are compressed to sub-picosecond duration and then amplified in an erbium doped fiber amplifier (EDFA) to a level of 2 nanoJoules. However, strong nonlinear interaction in the fiber causes pulse distortion, thereby reducing attainable energy.

That is, the output energy which can be extracted from rare-earth doped fiber amplifiers, although potentially high, is limited by the amount of peak power they can sustain before causing nonlinear effects and pulse break-up. For example, single-mode erbium doped fiber amplifiers have saturation energies of approximately one microJoule; and a multi-mode erbium doped fiber amplifier as described in a document entitled "111 kW (0.5 mJ) pulse amplification at 1.5 $\mu$m using a gated cascade of three erbium doped fiber amplifiers," by B. Desthieux et al., Appl. Phys. Lett. 63 (5), Aug. 2, 1993: Amer. Inst. of Physics, pages 586–587, can produce pulse energy as high as 0.5 milliJoules. However, low peak power must be maintained in a fiber amplifier, as such energy levels can render peak power of the amplified ultrashort pulses unacceptably high for a fiber (e.g., approximately 1 MegaWatt for a 1 picosecond pulse in a single-mode fiber). The light associated with this power, when confined in the small core of a fiber, results in high peak intensities which can lead to nonlinear effects and pulse break-up.

One approach for maintaining low peak power in an amplifier has been to use chirped pulse amplification to stretch the pulses prior to amplification as described in a document entitled "Compression of Amplified Chirped Optical Pulses" by Donna Strickland and Gerard Mourou, Elsevier Science Publishers B.V.: Optics Communications, Vol. 56, No. 3, Dec. 1, 1985. As described therein, ultrashort pulses from a mode-locked solid-state laser are stretched in duration using an optical fiber. Afterwards, the stretched pulses are amplified and then compressed using a double-grating compressor. By amplifying the stretched pulses of relatively long pulse duration, peak power is maintained relatively low in the amplifier such that non-linear effects and pulse break-up are prevented. In a document entitled "Generation of Ultra High Peak Power Pulses By Chirped Pulse Amplification", by P. Maine et al, IEEE Journal of Quantum Electronics, Vol. 24, No. 2, Feb. 1988, a similar chirped pulse amplification technique is described wherein a diffraction-grating pair is used in place of an optical fiber to stretch the chirped pulses.

The chirped pulse amplification technique has also been applied to fiber amplifiers using a mode-locked fiber laser source of ultrashort pulses, as described in the following three documents: (1) "Generation of High Power Ultrashort Pulses in Erbium Oscillator Power Amplifier Systems" by M. L. Stock et al, Optical Society of America Topical Meeting on Non-Linear Guided Wave Phenomenon, Cambridge, 1993, Paper PD 5; (2) a document entitled "High-Power Chirped Pulse Amplification of Femtosecond Optical Pulses in a Diode-Pumped Fiber Laser and Amplifier System" by A. Galvanauskas et al available from IMRA America, Ind., Ann Arbor, Mich.; and (3) "All-Fiber Source of 100 nJ sub-picosecond Pulses" by M. E. Fermann et al, Appl. Phys. Lett., Vol. 64, No. 11, Mar. 14, 1994. The techniques described in these latter documents can produce pulse energies up to, for example, 100 nanoJoules with a 700 femtosecond duration.

Although systems exist to produce ultrashort pulses with increased pulse energy, such systems suffer significant drawbacks. For example, the use of chirped pulse amplification with femtosecond mode-locked fiber lasers or semiconductor lasers with external cavities requires use of bulk components, and such systems are not particularly robust or reliable. Further, mode-locked lasers are operated with high repetition frequencies, and are therefore unsuitable for use in high-energy amplification which requires relatively low pulse repetition rates. Because mode-locked lasers are operated with high repetition frequencies, complicated and expensive pulse selecting systems are used, further inhibiting overall system compactness. In addition, the use of a diffraction-grating stretcher detracts from overall system compactness and robustness.

Accordingly, it would be desirable to provide a compact system capable of producing and amplifying chirped pulses to provide high energy ultrashort pulses. Further, it would be desirable to provide a compact system which is reliable and cost effective to fabricate.

SUMMARY OF THE INVENTION

The present invention is directed to providing compact systems and methods for producing and amplifying chirped pulses to provide high energy ultrashort pulses. Further, the present invention is directed to providing a compact system which is reliable and cost effective to fabricate.

In accordance with exemplary embodiments, relatively compact tunable lasers can be used to directly generate long chirped optical pulses. For example, compact monolithic semiconductor lasers which have relatively small dimensions (e.g., dimensions smaller than large frame solid state lasers) and which permit their emission wavelength to be tuned (i.e., changed) relatively fast during the generation of an optical pulse can be used. These pulse sources eliminate any need for bulk components in the cavity of, for example, a mode-locked femtosecond laser. The relatively long chirped optical pulses can subsequently be amplified in plural amplification stages to increase their energy content. In accordance with exemplary embodiments, amplification in plural stages can be achieved by suppressing spontaneous emission between the stages. Afterwards, the amplified pulses can be recompressed.

By fast tuning the emission wavelength of a tunable laser to directly generate relatively long chirped optical pulses, any need to stretch femtosecond pulses generated by a large-frame system is eliminated. The chirped pulses can be amplified prior to compression, thereby avoiding nonlinear interaction in the amplifier. Exemplary embodiments of the present invention can thus be designed significantly more compact, and can be cost effectively fabricated to provide systems with improved robustness and reliability.

To produce high peak power pulsed energy, exemplary compact systems of the present invention include: means for producing an energy pulse having plural wavelength bands, the energy pulse being compressible in duration by overlapping the wavelength bands; and means for increasing peak power of the energy pulse, said peak power increasing means further including: means for amplifying said energy pulse in plural stages of amplification to produce an amplified energy pulse; and means for suppressing spontaneous emission between at least two stages of said amplifying means.

Alternate exemplary embodiments include means for producing an energy pulse having plural wavelength bands, the energy pulse being compressible in duration by overlapping said wavelength bands; means for tuning an emission wavelength of the energy pulse producing means during generation of the energy pulse; and means for increasing peak power of the energy pulse, the peak power increasing means further including: means for amplifying the energy pulse in plural stages of amplification to produce art amplified energy pulse; means for suppressing spontaneous emission between at least two stages of said amplifying means; and means for compressing the amplified energy pulse by overlapping said wavelength bands.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
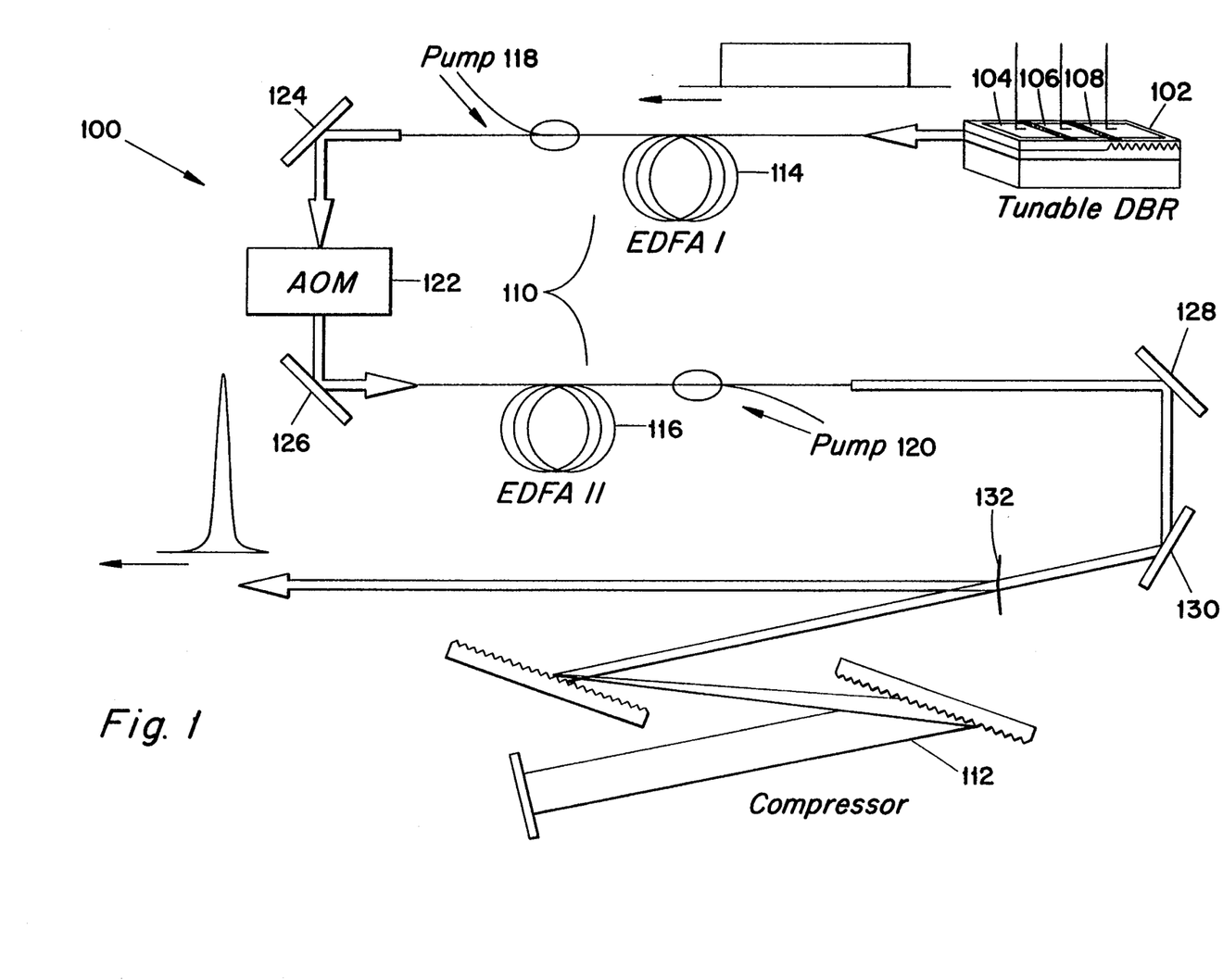
FIG. 1 shows an exemplary system for producing high peak power pulse energy in accordance with the present invention.

FIG. 1 illustrates an apparatus represented as a compact system 100 for producing high peak power pulsed energy using a compact source of microJoule energy, ultrashort pulses. The compact system 100 includes means for producing a chirped pulse, the chirped pulse being an energy pulse having plural wavelength bands, and being compressible in duration by overlapping the wavelength bands. In the compact system of FIG. 1, a monolithic tunable laser diode 102 is used for directly generating broad-bandwidth, linearly chirped optical pulses. Because the laser diode is monolithic, it does not exhibit the stability problems typical in other fiber sources, such as mode-locked fiber sources.

In the exemplary FIG. 1 embodiment, the tunable laser diode 102 is a three-section, distributed Bragg-reflector diode laser. Positive chirp can be obtained by fast tuning the emission wavelength of the distributed Bragg-reflector diode laser. Fast tuning of the emission wavelength can be achieved in a manner described, for example, in a document entitled "Real-Time Picosecond Electro-Optic Oscilloscope Technique Using A Tunable Semiconductor Laser" by A. Galvanauskas, Appl. Phys. Lett., Vol. 60 (2), 1992, American Institute of Physics, Jan. 13, 1992, page 145–147.

The distributed Bragg-reflector diode laser 102 includes an active gain section 104, a phase-control section 106 and a Bragg-reflector section 108. The Bragg-reflector section 108 is a narrow-band reflecting filter which serves as a laser mirror and which allows lasing in only one longitudinal mode. By introducing changes to the refractive indices of phase control section 106 and Bragg-reflector section 108, the wavelength of the longitudinal mode and the wavelength of the reflection peak, respectively can be independently shifted.

Changes in the refractive indices of the tuning sections (i.e., the phase control section 106 and Bragg-reflector section 108) can be introduced by increasing free-carrier concentration in these tuning sections. For example, an increase in free-carrier concentration lowers the refractive index and shortens the wavelength in a given tuning section, and can be achieved by applying current pulses to the tuning sections 106 and 108. The carrier concentration increases linearly in time at the beginning of each tuning pulse, with the rate and duration of the increase being determined by the carrier recombination rate and by the magnitude of the injected current. The linear increase typically lasts for hundreds of picoseconds. The magnitudes of the current pulses injected into the phase-control and Bragg tuning sections can be selected such that wavelength shifts in both of these tuning sections will be equal, thereby producing continuously chirped, sub-nanosecond pulses.

The fast-tuning of the diode laser 102 in accordance with exemplary embodiments of the present invention provides significant advantages. For example, the bandwidth of chirped pulses produced by diode laser 102 can be up to 15 nanometers or greater as described, for example, in a document entitled "Optimization Of The Carrier-Induced Effective Index Change In InGaAsP-/InP Waveguides-Application To Tunable Bragg Filters" by Jean-Pierre Weber, preprint submitted to IEEE J. Quantum Electronics, Dec. 17, 1992. This bandwidth corresponds to a transform-limited duration of approximately 300 femtoseconds for the compressed pulses, and the tuning range of these InGaAsP/InP devices is typically within the gain band of erbium doped fiber amplifiers.

The duration and bandwidth of chirped pulses can be electrically controlled within a range on the order of a picosecond up to few nanoseconds or greater. Thus, even at microJoule energies, the pulse can be amplified while maintaining peak power relatively low. The laser diode can be operated in both a single-pulse mode and with variable repetition rates of up to tens of megahertz, thereby allowing optimization of gain saturation in an erbium doped fiber amplifier. An ability to operate the laser diode with variable repetition rates renders the system suitable for many practical applications, including, but not limited to, sampling measurements.

Having described means for producing a chirped pulse in accordance with an exemplary embodiment of the present invention, additional features of the compact system 100 will now be described. As illustrated in FIG. 1, the compact system further includes means for increasing peak power of the energy pulse. The peak power increasing means includes means for amplifying the energy pulse, generally represented as a two-stage erbium doped fiber amplifier 110, and a means for compressing the amplified energy pulse by overlapping the wavelength bands, the compressing means being generally represented as a grating-pair compressor 112.

The two-stage erbium doped fiber amplifier includes a first stage energy amplifier 114 having a rare-earth (e.g., erbium) doped fiber for providing a first amplified output, and a second stage energy amplifier 116 also having a rare-earth (e.g., erbium) doped fiber for receiving the first amplified output. By amplifying nanosecond chirped pulses from the tunable laser diode in an erbium doped fiber, saturation energy of the amplifier is obtained without pulse break-up. In accordance with exemplary embodiments, the fiber of the second stage energy amplifier 116 can be shorter in length than the fiber of the first stage energy amplifier 114 to reduce pulse propagation length, and thereby reduce the effect of non-linearities in the second energy amplifier. The second stage energy amplifier 116 provides a second amplified output which is directed to the grating-pair compressor 112.

In accordance with exemplary embodiments, the gain of a single-pass, single-stage erbium doped fiber amplifier which can be used as the first and second energy amplifiers for a broad bandwidth, chirped signal is limited to approximately 20 to 40 decibels. Accordingly, the two-stage erbium doped fiber amplifier 110 can collectively amplify chirped optical pulses by approximately 40 to 80 decibels (e.g., from picoJoules to microJoules).

A first pump 118 associated with the first stage energy amplifier 114, and a second pump 120 associated with the second stage energy amplifier 116 are arranged to counter-propagate with respect to the signal in each of the first and second energy amplifiers, thereby improving gain saturation characteristics. In an exemplary embodiment, the first stage energy amplifier 114 can be pumped with 70 milliWatts at 1.48 microns using a pigtailed laser diode. The fiber of the first energy amplifier can be 40 meters in length, have a core diameter of 8 microns, a numerical aperture of 0.2, and a doping level of 580 parts per million. The second energy amplifier can be 3.2 meters in length, have a 7 micron core diameter and have a highly doped level of, for example, 5000 parts per million. The second stage can be pumped with a power of, for example, 330 milliWatts using a wavelength of 980 nanometers.

Because the first and second energy amplifiers are cascaded, the amplified spontaneous emission from the first stage energy amplifier 114 will be amplified in the second stage energy amplifier 116. Accordingly, this amplified spontaneous emission can be strong enough to saturate the gain of the second energy amplifier, thereby substantially reducing amplification within the second stage amplifier. A peak power increasing means in accordance with the present invention therefore includes means, such as a fast accousto-optic modulator 122, for suppressing spontaneous emission between the first stage energy amplifier and the second stage energy amplifier.

The accousto-optic modulator 122 can be used as an optical gate between the first and second stage energy amplifiers to prevent saturation of the second stage amplifier 116. Accousto-optic modulators are typically polarization insensitive and have relatively low insertion loss. The accousto-optic modulator 122 is synchronized with driving electronics of the distributed Bragg-reflector diode laser 102, such that it opens only when amplified chirped pulses are produced by the first stage energy amplifier 114. In accordance with an exemplary embodiment, a gate width of the accousto-optic modulator can be 150 nanoseconds, and a diffraction efficiency of the modulator for this gate width can be approximately 70 percent.

The amplified output from the second stage energy amplifier 116 is input to a compressor which includes at least one diffraction grating such that pulses of at least picosecond duration with peak powers close to one MegaWatt can be obtained. In the exemplary FIG. 1 embodiment, the diffraction grating-pair 112 is configured in a negative-dispersion arrangement to compensate linear positive chirp of the amplified pulse energy received. For example, diffraction gratings with 1200 lines per millimeter can be used in a standard negative-dispersion compressor arrangement to compensate linear chirp of pulses output by the two-stage amplifier 110.

While components of the exemplary FIG. 1 embodiment can be implemented in a linear arrangement, for convenience of illustration and for compactness in implementation, mirrors can be included to permit a rearrangement of the FIG. 1 components. For example, mirrors 124 and 126 can be used in the two-stage amplifier to direct energy from the first stage to the accousto-optic modulator, and to direct energy from the accousto-optic modulator to the second stage. As illustrated, the mirrors 124 and 126 can each be used to redirect the energy 90 degrees. Similarly, mirrors 128 and 130 can be used between the two-stage amplifier and the grating-pair compressor 112 to direct energy from the two stage amplifier into the compressor. As illustrated in FIG. 1, the mirror 128 redirects energy 90 degrees while the mirror 130 directs energy by an angle slightly greater than 90 degrees into the grating-pair compressor 112.

The exemplary FIG. 1 embodiment can also include a mirror 132 for permitting energy from the two-stage amplifier to pass to the grating-pair compressor, and for reflecting compressed energy from the grating-pair compressor to an output as high peak power pulsed energy.

Figure 2A:
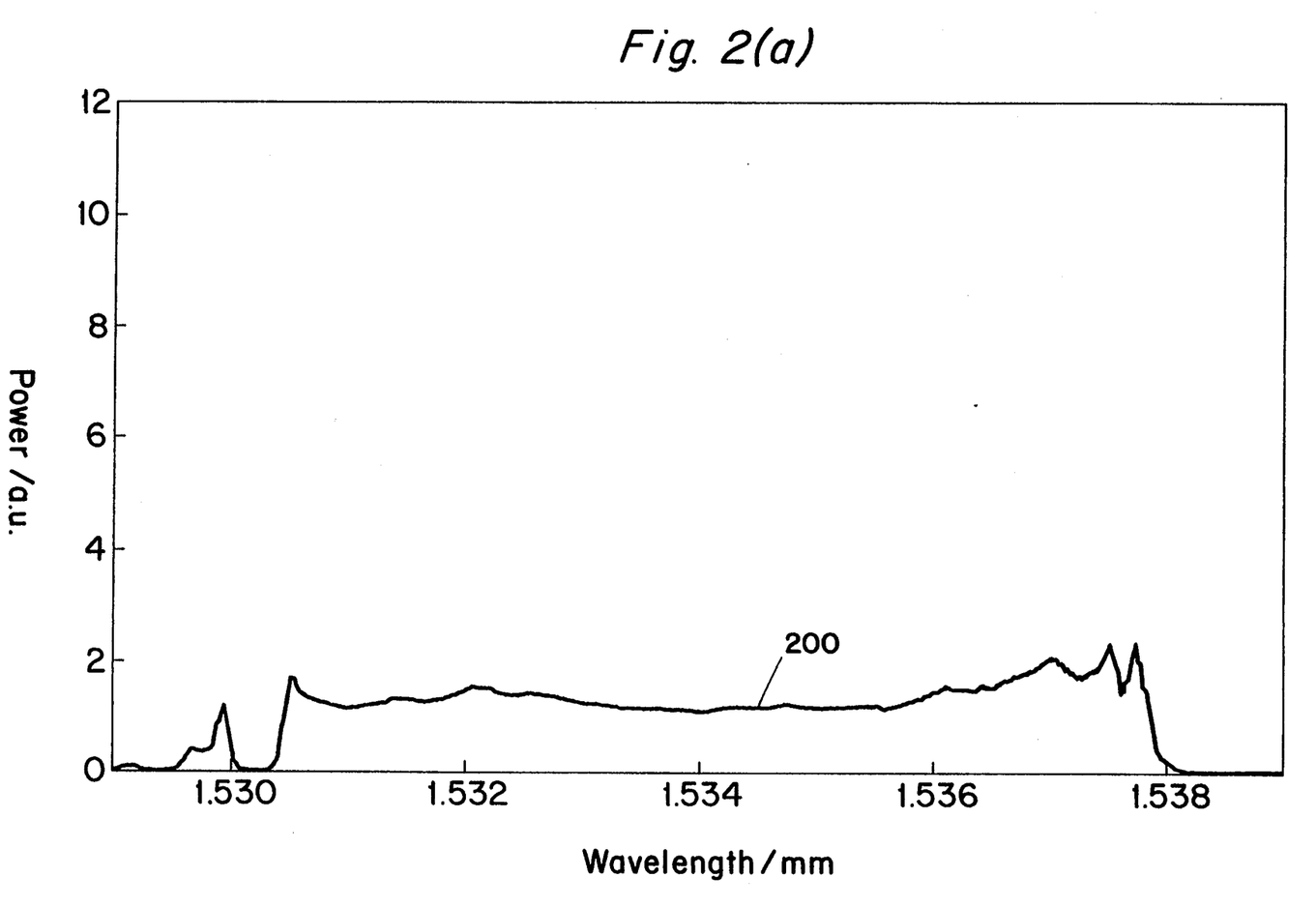
FIGS. 2(a)-2(b) show a time-integrated power spectrum 200 of a pulse from a tunable distributed Bragg-reflector diode laser, and a measured wavelength evolution 200 of a chirped pulse produced by a tunable distributed Bragg-reflector diode laser.
Figure 2B:
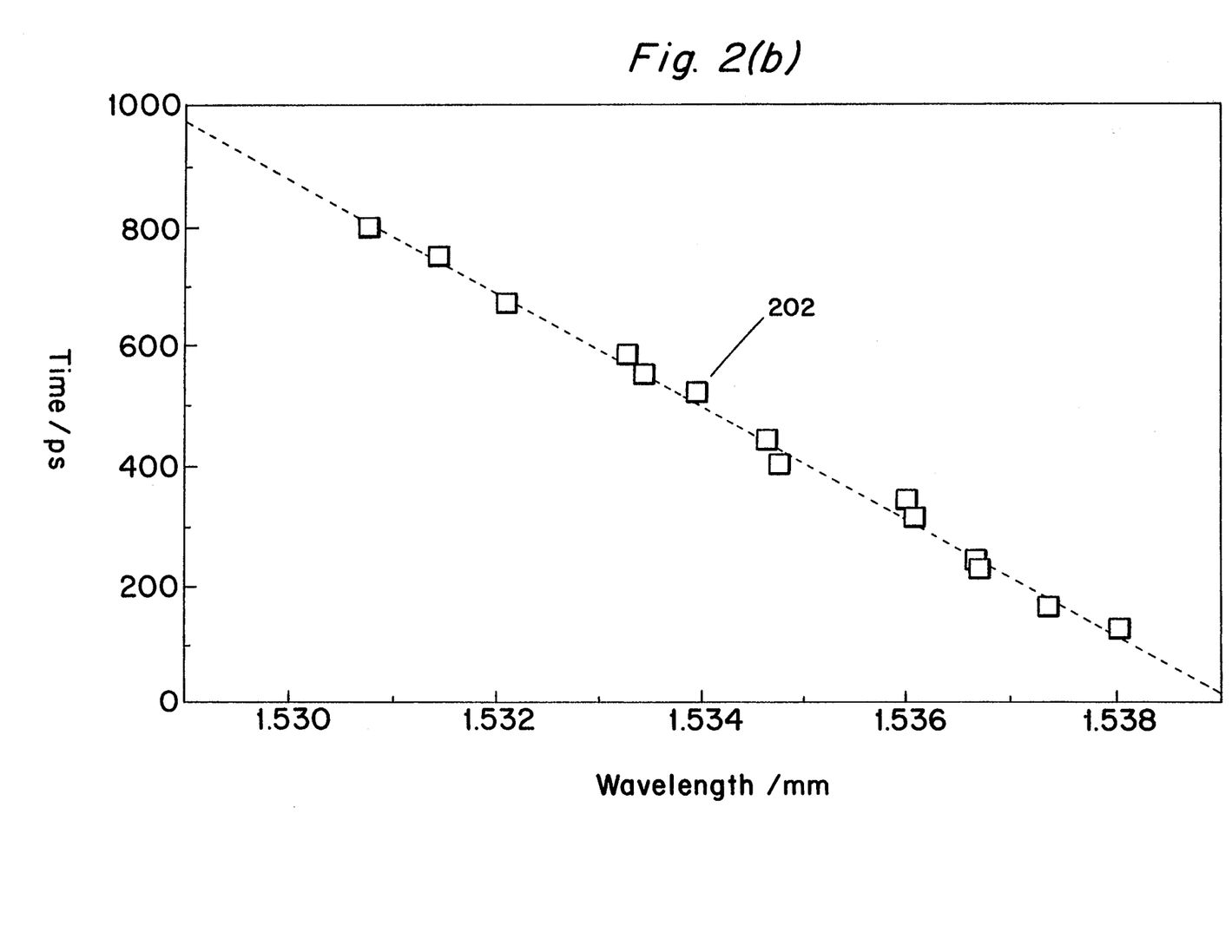
Figure 3A:
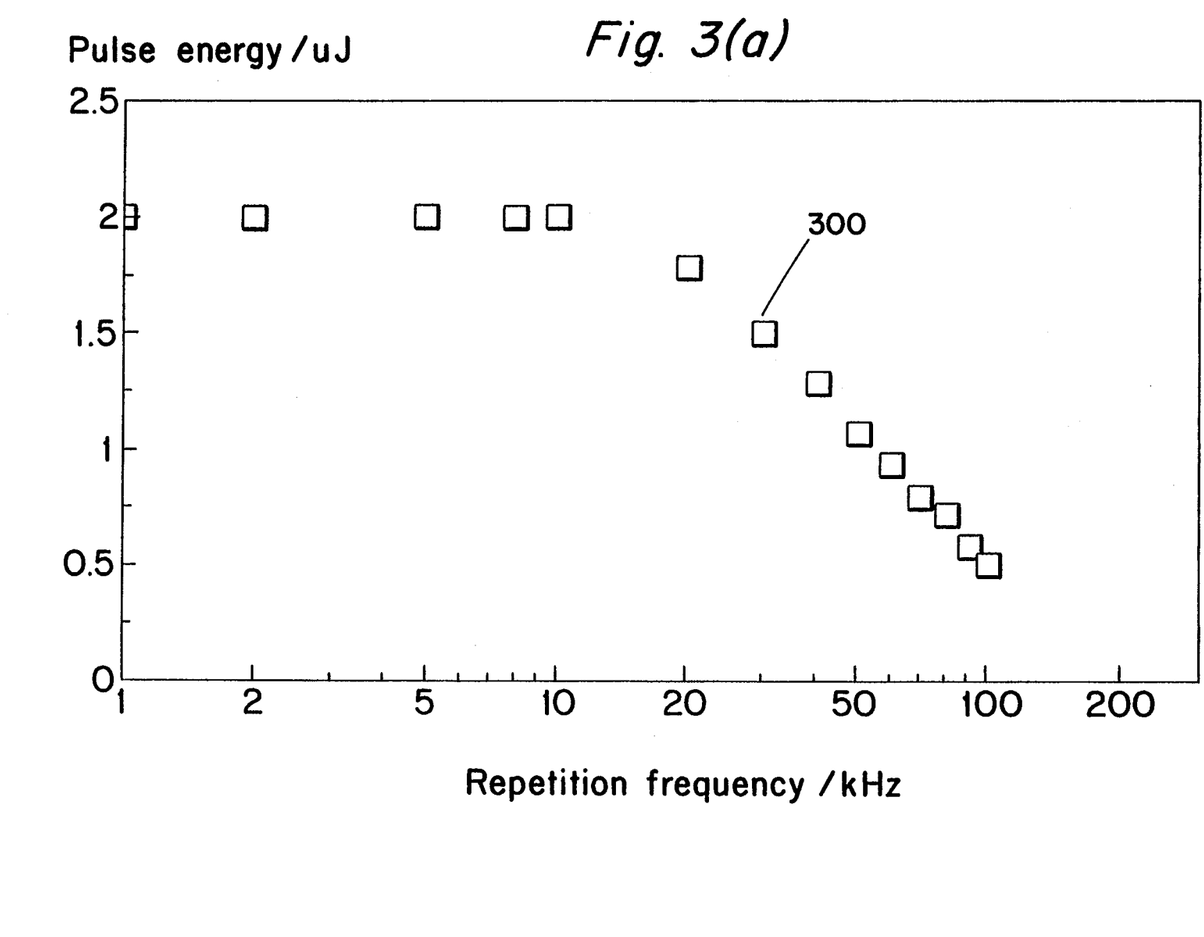
FIGS. 3(a)-3(b) show the energies 300 and average output powers 302 of amplified pulses at different repetition frequencies.
Figure 3B:
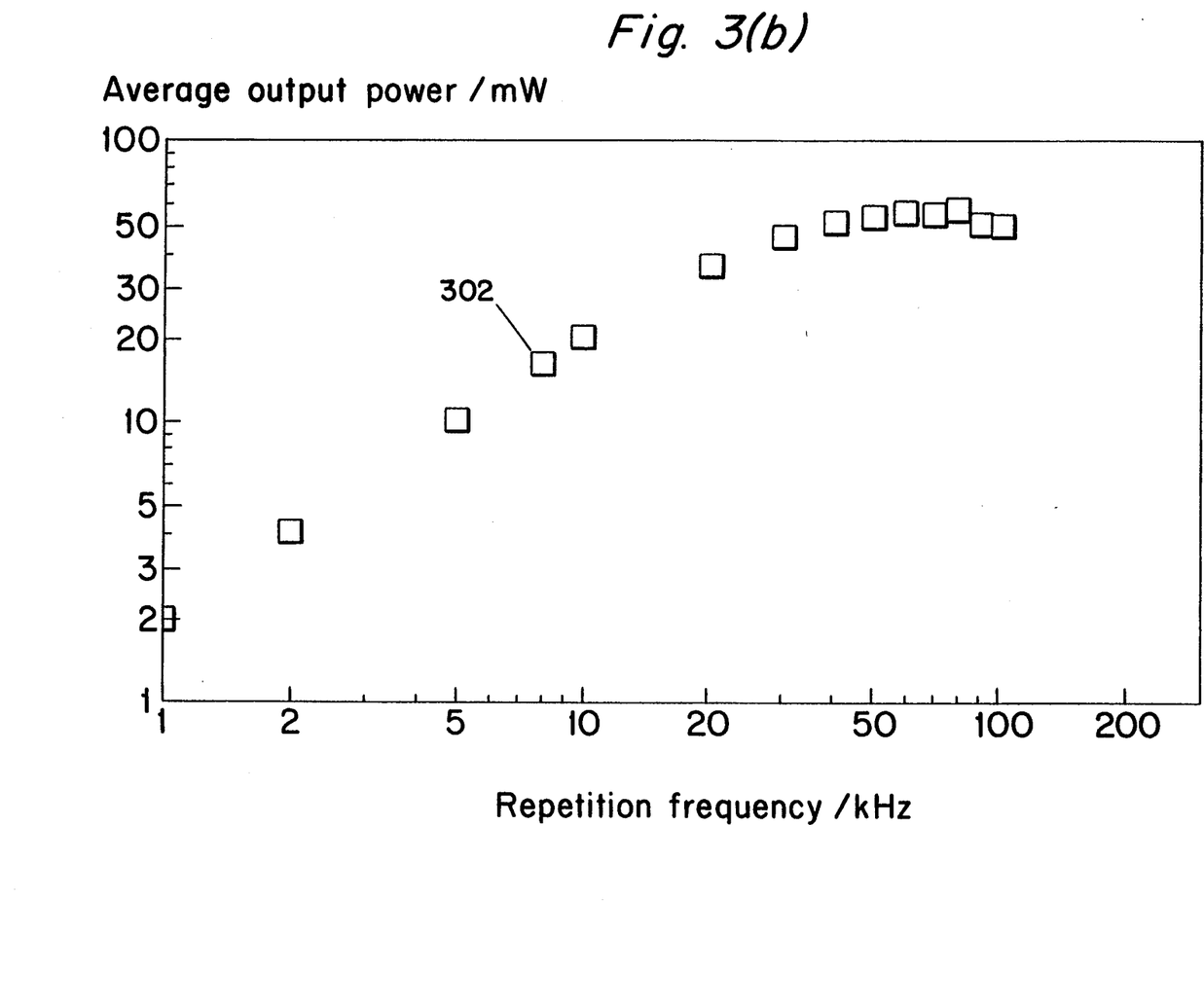

An exemplary implementation of the FIG. 1 compact system will now be described in greater detail with respect to FIGS. 2–4. Referring to FIGS. 2(a) and (b), a typical integrated power spectrum 200 is shown in FIG. 2(a) and a corresponding wavelength evolution 202 of chirped optical pulses generated with the diffraction Bragg-reflector laser diode 102 is shown in FIG. 2(b). In the first stage energy amplifier 114, pulse energy can be increased, for example, from 25 picoJoules to about 5 nanoJoules. After passing through the accousto-optic modulator 122, only a fraction of the total energy per pulse (e.g., less than 10 percent) is contained in the spontaneous emission background.

By varying the repetition frequency of the laser diode 102 from approximately 1 kilohertz to 300 kilohertz, only weak saturation of the gain in the first stage energy amplifier occurs. However, energy of the amplified pulses will be considerably higher in the second stage amplifier, such that gain saturation will be more pronounced in this second stage. As illustrated in FIGS. 3(a) and 3(b), an energy of, for example, two microJoules can be obtained at frequencies of between 1 kilohertz and 10 kilohertz. This corresponds to an overall gain of 49 decibels when using the two-stage energy amplifier of FIG. 1. As illustrated in FIG. 3(a), at frequencies greater than 10 kilohertz, pulse energy in the exemplary embodiment described above decreases with an increase in repetition rate (reaching, for example, 500 nanoJoules at 100 kilohertz). In accordance with an exemplary embodiment, average signal power at 10 kilohertz can be approximately 20 milliWatts, and at frequencies greater than 40 kilohertz, can be approximately 50 milliWatts as illustrated in the exemplary FIG. 3(b) chart.

Figure 4:
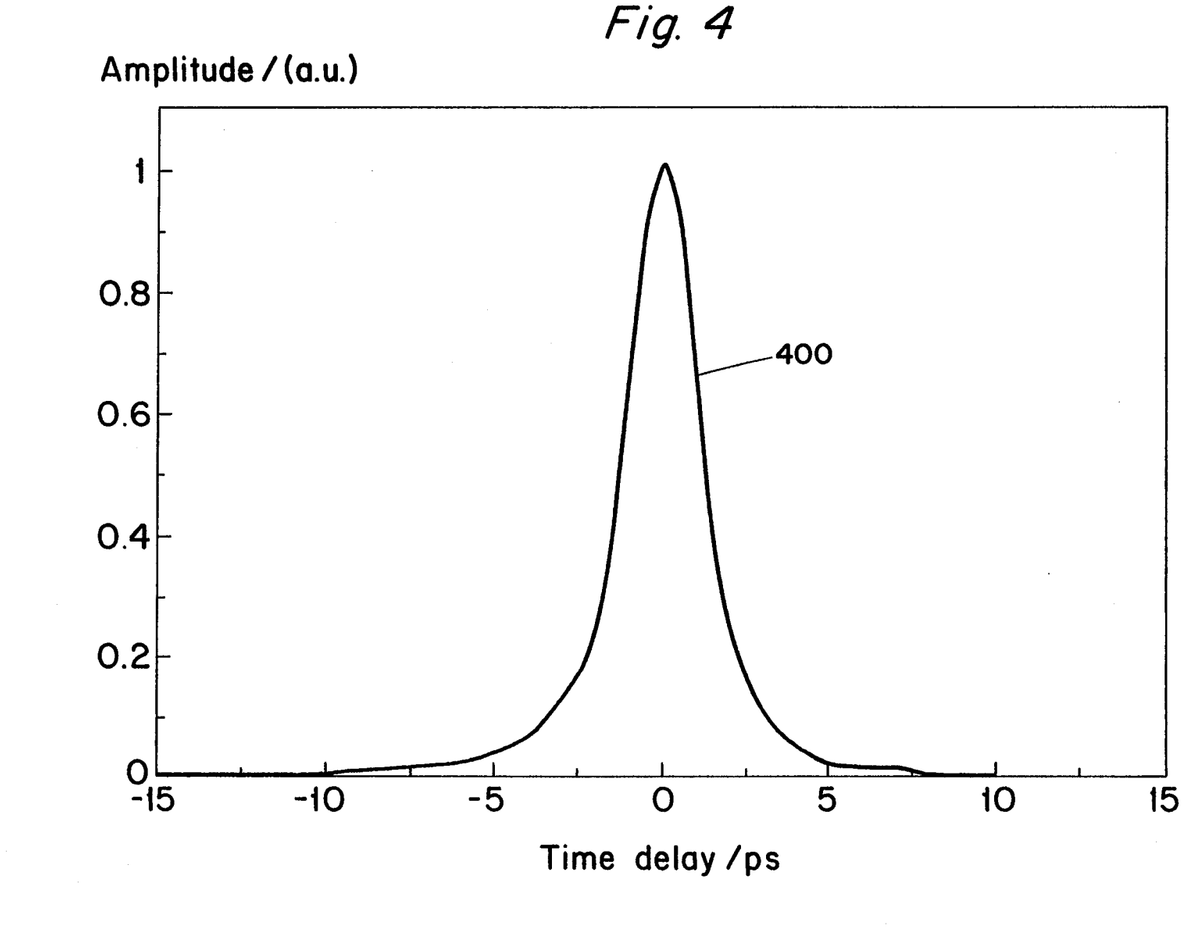
FIG. 4 shows a second-harmonic autocorrelation trace 400 of compressed 1.8 picosecond pulses.

The grating-pair compressor 112 can be used to compress the pulses to approximately 1.8 picoseconds or less (i.e., sub-picosecond range) as illustrated in FIG. 4, with an energy of approximately 800 nanoJoules. By increasing the linearity of the chirping of initial pulses from the laser diode 102, and by minimizing optical non-linearities in the second stage energy amplifier at high peak-powers, shorter pulses can be obtained.

Figure 5:
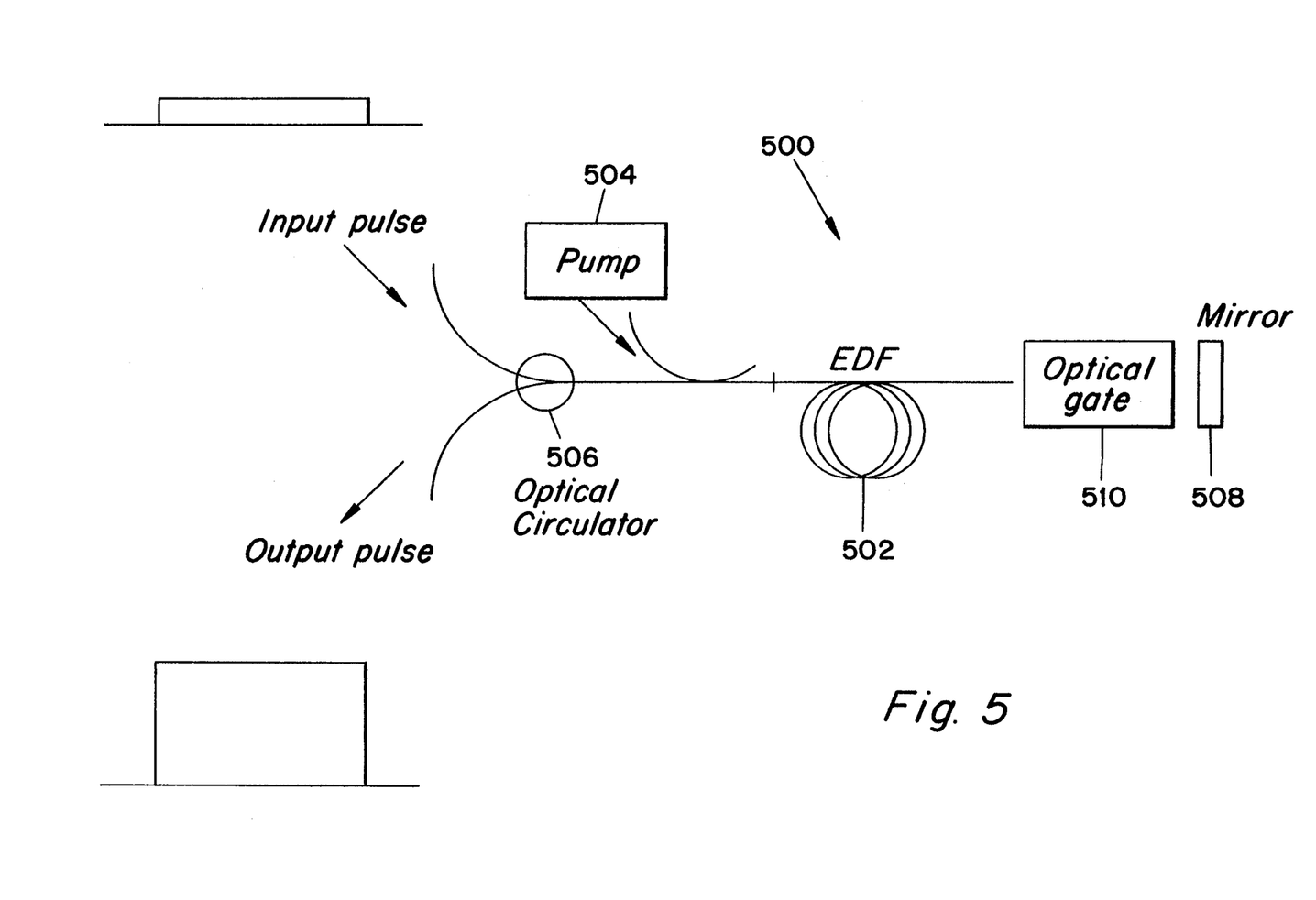
FIG. 5 shows an alternate exemplary embodiment of the present invention which includes an optical circulator.

In accordance with an alternate embodiment of the present invention as illustrated in FIG. 5, a compact system for producing high peak power pulsed energy can include an energy pulse amplifying means having at least one energy amplifier, and means for circulating the energy pulse through the at least one energy amplifier a plurality of times. More particularly, the two-stage amplifier 110 of the FIG. 1 embodiment can be implemented using a single stage erbium doped fiber amplifier 502 and an optical circulator 506. The signal can be passed in counter-propagating fashion with respect to a optical pump 504. The optical circulator 506 can be used in conjunction with a reflecting means represented as mirror 508 to pass optical input pulses received from a pulse source, such as the tunable distributed Bragg-reflector laser diode of FIG. 1, one or more times through the single-stage amplifier 502, thereby implementing plural stages of amplification. This arrangement can thus be used to increase the energy extracted from the single amplifier.

In the exemplary FIG. 5 embodiment, the single-stage energy amplifier 502 is a two-pass fiber amplifier which generates an amplified output that can be directed to a compressing means, such as the grating-pair compressor of FIG. 1. The use of a multiple pass amplifier as a multi-stage amplifier can eliminate any need for plural fiber amplifiers.

In addition to optical circulator 506, the FIG. 5 embodiment includes means for suppressing spontaneous emission between the plural stages of amplification, represented as optical gate 510. As with the FIG. 1 embodiment, the optical gate can be synchronized to the pulse energy producing means in conventional manner so that the optical gate selectively passes pulses from the laser diode.

Thus, exemplary embodiments of the present invention can generate optical pulses of picosecond duration or less having microJoule energy using a compact system which includes a tunable diode laser and multiple stages of amplification. The multiple stages of amplification can be implemented as either a single stage amplifier and optical circulator, as a multi-stage amplifier having separate amplification stages, or as a combination of a single stage amplifier/optical circulator and separate amplification stages. Estimated peak power of amplified, compressed pulses can be 0.5 megawatts or greater, with pulse durations in the sub-picosecond range.

Those skilled in the art will of course appreciate that embodiments other than those described above can be implemented in accordance with the present invention. For example, as mentioned previously, the erbium doped fiber amplifiers in the exemplary embodiments described can be implemented using any available type of fiber amplifier. Alternately, the system can include bulk amplifiers for attaining high pulse energies.

The exemplary embodiments described with respect to FIGS. 1–5 include a two-stage arrangement wherein two stages of amplification are performed using two separate energy amplifiers or using two passes with respect to a single stage amplifier. However, those skilled in the art will appreciate that high energies can be obtained by increasing the number of stages (i.e., number of separate amplifier stages and/or number of passes employed).

Further, while an accousto-optic modulator is included between each of the multiple stages of the amplifier, those skilled in the art will appreciate that other types of devices for suppressing the spontaneous emission between the amplification stages can be used. In place of an accousto-optic modulator, electro-optic switches, optical filters saturable absorbers, or any relatively fast optical switch can be used as exemplary alternates.

The exemplary embodiments described above include a semiconductor chirped pulse source represented as a three-section distributed Bragg-reflector diode laser. However, those skilled in the art will appreciate that any laser device (e.g., any semiconductor, optical fiber or optical waveguide laser energy source) which can have its emission wavelength tuned in a relatively fast manner (e.g., to control the duration and bandwidth of chirped pulses within a range on the order of at least a picosecond up to several nanoseconds, or greater), can be used as the energy producing means.

In exemplary embodiments, the laser can be tuned within a period of time ranging, for example, from a picosecond to several nanoseconds (or greater if appropriate compression of the output pulse can be performed). Those skilled in the art will appreciate that the only limiting factor with respect to the selection of the energy pulse source is the length of the pulses which can be reliably compressed. As the pulse duration is increased, the pulse becomes increasingly difficult to compress subsequent to amplification. Thus, provided suitable compression can be achieved, any available laser source can be used as the energy pulse producing means including, waveguide lasers. Other tunable laser diodes which can be used as a pulsed energy source in accordance with exemplary embodiments of the present invention and which can function in a manner similar to that of the distributed Bragg-reflector laser diode described with respect to FIG. 1 include, for example, the tunable laser sources described in the document entitled "Broadly Tunable InGaAsP/InP Laser Based On A Vertical Coupler Filter With 57-nm Tuning Range" by R.C. Alferness et al, Appl. Phys. Lett., Vol. 60, 1992, pages 3209–3211.

Further, the counter-propagating arrangement of pumps 116 and 118 with respect to signals input to the amplifier stages is by way of example only. Those skilled in the art will appreciate that pumps arranged to co-propagate with respect to signal pulses input to the amplifiers can also be used.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for producing high peak power pulsed energy comprising:
   means for producing a tunable and compressible energy pulse having plural wavelength bands by tuning an emission wavelength of the energy pulse, said energy pulse being compressible in duration by overlapping said wavelength bands; and
   means for increasing peak power of said energy pulse, said peak power increasing means further including:
      means for amplifying the energy pulse in plural stages of amplification to produce an amplified energy pulse; and
      means for suppressing spontaneous emission between at least two stages of said amplifying means.

2. Apparatus according to claim 1, further including:
   means for compressing said amplified energy pulse by overlapping said wavelength bands.

3. Apparatus according to claim 2, wherein said compressing means includes:
   at least one diffraction grating for compressing said amplified energy pulse by overlapping said wavelength bands.

4. Apparatus according to claim 3, wherein said compressing means includes:
   at least one pair of diffraction gratings.

5. Apparatus according to claim 3, wherein said compressing means includes:
   a pair of diffraction gratings configured in a negative-dispersion arrangement to compensate linear chirp of the amplified pulse energy.

6. Apparatus according to claim 1, wherein said energy pulse producing means includes:
   an energy source having an emission wavelength which is tuned within a period of time ranging from a picosecond to several nanoseconds during generation of said energy pulse.

7. Apparatus according to claim 1, wherein said energy pulse producing means includes at least one of: a semiconductor laser energy source, an optical fiber laser energy source and an optical waveguide laser energy source.

8. Apparatus according to claim 1, wherein said energy pulse producing means is a tunable distributed Bragg-reflector diode laser which includes:
   an active section, a phase control section, and a Bragg-reflector section.

9. Apparatus according to claim 1, wherein said amplifying means includes:
   a first energy amplifier for receiving said energy pulse from said energy pulse producing means and for providing a first amplified output; and
   a second energy amplifier for receiving said first amplified output and for providing a second amplified output.

10. Apparatus according to claim 9, further including:
    means for compressing said amplified energy pulse by overlapping said wavelength bands.

11. Apparatus according to claim 10, wherein said first and second energy amplifiers include rare-earth doped fibers, and wherein said spontaneous emission suppressing means includes:
    an optical gating means synchronized with said pulse energy producing means.

12. Apparatus according to claim 1, wherein said amplifying means includes:
    a first energy amplifier having a rare-earth doped fiber for providing a first amplified output; and
    a second energy amplifier having a rare-earth doped fiber for receiving said first amplified output, said fiber of said second energy amplifier being shorter in length than the fiber of said first energy amplifier to reduce pulse propagation length.

13. Apparatus according to claim 1, wherein said amplifying means includes:
    at least one fiber amplifier; and
    means for circulating the energy pulse through the at least one fiber amplifier a plurality of times to provide the plural stages of amplification.

14. Apparatus according to claim 13, wherein said suppressing means includes:
    an optical gating means synchronized with said plural energy producing means.

15. Apparatus for producing high peak power pulsed energy comprising:
    means for producing a compressible energy pulse having plural wavelength bands, said energy pulse being compressible in duration by overlapping said wavelength bands;
    means for tuning an emission wavelength of said energy pulse producing means during generation of said energy pulse; and
    means for increasing peak power of said energy pulse, said peak power increasing means further including:
       means for amplifying the energy pulse in plural stages of amplification to produce an amplified energy pulse;
       means for suppressing spontaneous emission between at least two stages of said amplifying means; and
       means for compressing said amplified energy pulse by overlapping said wavelength bands.

16. Apparatus according to claim 15, wherein said energy pulse producing means is a tunable distributed Bragg-reflector diode laser which includes:
    an active section, a phase control section, and a Bragg-reflector section.

17. Apparatus according to claim 16, wherein said amplifying means includes:
    a first energy amplifier having a rare-earth doped fiber for providing a first amplified output; and
    a second energy amplifier having a rare-earth doped fiber for receiving said first amplified output, said fiber of said second energy amplifier being shorter in length than the fiber of said first energy amplifier to reduce pulse propagation length.

18. Apparatus according to claim 17, wherein said suppressing means further includes:
   an optical gating means synchronized with said pulse energy producing means.

19. Apparatus according to claim 15, wherein said energy pulse amplifying means includes:
   at least one energy amplifier; and
   means for circulating the energy pulse through the at least one energy amplifier a plurality of times to provide the plural stages of amplification.

20. Method for producing high peak power pulsed energy comprising the steps of:
   tuning an emission wavelength of an energy pulse producing means to provide a compressible energy pulse having plural wavelength bands;
   amplifying the energy pulse by using plural stages of amplification to produce an amplified energy pulse; and
   suppressing spontaneous emission between at least two of said amplification stages.

21. Method according to claim 20, further including a step of:
   compressing said amplified energy pulse by overlapping said wavelength bands.

22. Method according to claim 21, wherein said step of amplifying further includes a step of:
   amplifying the energy pulse using a plurality of rare-earth doped fiber amplifiers.

23. Method according to claim 21, said step of amplifying further includes a step of:
   circulating the energy pulse through at least one energy amplifier a plurality of times to provide the plural stages of amplification.

24. Method according to claim 20, further including a step of:
   tuning said emission wavelength of said energy pulse producing means within a period of time ranging from a picosecond to several nanoseconds during generation of said energy pulse.

* * * * *

UNITED STATES PATENT AND TRADEMARK OFFICE
CERTIFICATE OF CORRECTION

PATENT NO. : 5,400,350
DATED : MARCH 21, 1995
INVENTOR(S) : ALMANTAS GALVANAUSKAS

It is certified that error appears in the above-indentified patent and that said Letters Patent is hereby corrected as shown below:

Column 6, line 2, change "accousto-optic" to --acousto-optic--;
Column 6, line 6, change "accousto-optic" to --acousto-optic--;
Column 6, line 9, change "Accousto-optic" to --Acousto-optic--;
Column 6, line 11, change "accousto-optic" to --acousto-optic--;
Column 6, line 16, change "accousto-optic" to --acousto-optic--;
Column 6, lines 40-41, change "accousto-optic" to --acousto-optic--;
Column 6, lines 41-42, change "accousto-optic" to --acousto-optic--;
Column 6, lines 67-68, change "accousto-optic" to --acousto-optic--;
Column 8, line 29, change "accousto-optic" to --acousto-optic--; and
Column 8, line 34, change "accousto-optic" to --acousto-optic--.

Signed and Sealed this

Thirteenth Day of June, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,400,350
DATED : March 21, 1995
INVENTOR(S) : ALMANTAS GALVANAUSKAS It is certified that error appears in the above-indentified patent and that said Letters Patent is hereby corrected as shown below:

IN THE DRAWINGS

Sheet 2 of 7, (Fig. 2(a)) change "Wavelength/mm" to --Wavelength/$\mu$m--.
Sheet 3 of 7, (Fig. 2(b)) change "Wavelength/mm" to --Wavelength/$\mu$m--.

Signed and Sealed this

Ninth Day of June, 1998

*Attest:*

BRUCE LEHMAN

*Attesting Officer*  *Commissioner of Patents and Trademarks*